United States Patent [19]

Nekola

[11] Patent Number: 5,660,077

[45] Date of Patent: Aug. 26, 1997

[54] SELF-CONTAINED MOTOR SPEED CONTROL DEVICE

[75] Inventor: Frank F. Nekola, Trenton, Fla.

[73] Assignee: Robert R. Pisano, Trenton, Fla.

[21] Appl. No.: 527,470

[22] Filed: Sep. 13, 1995

[51] Int. Cl.$^6$ .................................................. F16H 1/12
[52] U.S. Cl. ................... 74/416; 74/348; 74/380
[58] Field of Search ................... 74/348, 349, 351, 74/380, 385, 416; 476/55

[56] References Cited

U.S. PATENT DOCUMENTS

| | | | |
|---|---|---|---|
| 305,714 | 9/1884 | Schulze-Berge | 74/385 |
| 359,076 | 3/1887 | Hoffman | 476/55 |
| 958,694 | 5/1910 | Cox | 476/55 |
| 1,226,386 | 10/1917 | Schuhmann | 476/55 |
| 1,303,145 | 7/1919 | Bonduwe | 476/55 |
| 1,392,276 | 9/1921 | Kirkham . | |
| 1,674,698 | 6/1928 | Olson | 74/380 X |
| 4,173,155 | 11/1979 | Togami et al. . | |
| 4,173,156 | 11/1979 | Horowitz et al. . | |
| 4,427,930 | 1/1984 | Berman et al. . | |
| 4,427,931 | 1/1984 | Tsukihashi . | |
| 5,067,360 | 11/1991 | Nakano . | |
| 5,067,361 | 11/1991 | Lachenmaier . | |
| 5,067,372 | 11/1991 | Suzuki . | |
| 5,318,486 | 6/1994 | Lutz . | |
| 5,381,704 | 1/1995 | Knotts . | |
| 5,403,241 | 4/1995 | Jarchow et al. . | |
| 5,403,244 | 4/1995 | Tankersley et al. . | |
| 5,406,483 | 4/1995 | Kallis et al. . | |

*Primary Examiner*—Allan D. Herrmann
*Attorney, Agent, or Firm*—Saliwanchik, Lloyd & Saliwanchik

[57] ABSTRACT

A self-contained speed control device and system, primarily for electric and hybrid vehicles, includes a self-contained mechanical variable-speed control device. The device allows the motor to run constantly at its most efficient speed and temperature. The device is mechanically operated and connected to the motor and drive train. Speed is controlled by means of an accelerator cable connected to the device. When the accelerator is in the low or idle position, the torque is multiplied or increased instead of decreased, lessening the load on the motor, without additional load on the batteries. A continuous gear and slide arrangement creates a constantly variable speed combination, without interruption, giving the electric motor the feel of an internal combustion engine, without the disadvantage of building torque. The device includes a simplified two-piece housing, a cone shaped drive gear supported by a shaft and bearings, and a cam controlled variable pitch gear that slides on and in constant mesh with the main drive gear. The cam is supported by a shaft and bearings in communication with an oil sump incorporated in the device.

6 Claims, 4 Drawing Sheets

SELF-CONTAINED MOTOR SPEED CONTROL DEVICE

BACKGROUND OF THE INVENTION

Field of the Invention

The present invention relates to a motor speed control device, primarily for electric and hybrid vehicles.

A variety of motor speed control systems have been developed in the art. A major problem with these conventional systems is the difficulty of heat control and the cost of this equipment. When a vehicle climbs a steep grade, motor controllers been to heat up rapidly under the load and soon start to limit the power to the motor. The motor in a conventional electric vehicle operates by transferring power from the batteries in the form of Counter Electromotive Force. The amount of current flow is determined by the amount of resistance in the circuit or the load placed on the motor. Therefore, current flow has to be as much as four times the running current. This high current load must be carried by the motor speed controller. Generally, these are of MOSFET or Transistor design. Frequent starting or running of the motor at these high current flows causes these components to overheat and create an excessive drain on the batteries.

In addition, the varying rates at which the motor in these vehicles must rotate severely limits the range of travel of these vehicles. Conventional motor speed controllers, transmissions or gear-boxes do not solve this problem.

U.S. Pat. No. 1,392,276 discloses a reduction gear for a propeller to achieve slower propeller rotation than motor rotation. The speed reduction was achieved by engagement of a series of different diameter, discontinuous gears.

U.S. Pat. No. 4,173,155 discloses a variable diameter torque sensing drive aimed at extension of the life of V-belts in the transmission mechanisms of harvester combines. These belts were known to slip as sudden increased loads were placed on the harvester, resulting in premature destruction of the V-belts. The torque sensor comprised a set of "sheaves" of variable diameter which prevent slippage of the V-belts. In addition, a dual speed gear case assembly was described for use in connection with the variable diameter torque sensor wherein an operator could shift a driven gear in either a forward or rearward direction to engage with a different diameter drive gear.

U.S. Pat. No. 4,173,156 discloses an infinitely variable cone pulley gear in which torque is transmitted via an oil cushion intermediate a driving and a driven element to provide for a torque dependent oil pressure circuit.

U.S. Pat. No. 4,427,930 discloses an electric vehicle current regulator which provides a method for obtaining correspondence between the accelerator pedal displacement and motor speed of the electric vehicle.

U.S. Pat. No. 4,427,931 discloses a speed control apparatus for a direct current motor to achieve reduced energy consumption by a direct current motor in which a bridge circuit is used to eliminate unnecessary power consumption.

U.S. Pat. No. 5,067,360 discloses a toroidal continuously variable transmission comprising coaxial toric input and output elements.

U.S. Pat. No. 5,067,361 discloses a transmission series in which the center distances and transmission ratios of variation stages within the series are coordinated such that a reduction in the number of different gearwheels needed for use with different motors is reduced.

U.S. Pat. No. 5,067,372 discloses a control system for a continuously variable transmission comprising a hydrokinetic torque transmitting unit. The transmission ratio is varied by varying the contact radii of axially displaceable conical disks in contact with a V-belt.

U.S. Pat. No. 5,318,486 discloses a driving hub for a bicycle having an infinitely adjustable transmission ratio comprising a ball friction gear.

U.S. Pat. No. 5,381,704 discloses a bearing tooth gear in which rotative forces are transmitted through a series of meshed gears in which the sliding contact of conventional gear teeth is replaced with the rolling contact of rotatable bearings that contact corresponding teeth of an adjacent gear, with the axes of the two gears being variable over a wide range of angles relative to each other. One set of teeth are of conical shape to provide contact through the entire driving stroke.

U.S. Pat. No. 5,403,241 discloses an infinitely variable hydrostatic mechanical power shift gearbox in which a multi-shaft toothed-wheel planetary gearing achieves commensurate increases or decreases in the speed of rotation of input and output shafts.

U.S. Pat. No. 5,403,244 discloses an electric vehicle drive train with a transmission comprising a single stage planetary gearbox, operable either in a speed reduction mode at low speed, high torque requirement starting situations, and in a direct coupled mode in high speed, low torque requirement situations. The transmission requires at least momentary decoupling from the motor when operation is switched from the discontinuous speed reduction mode to the direct coupled mode. This also requires changes in the speed of rotation of the driving motor.

U.S. Pat. No. 5,406,483 discloses an engine having a variable transmission control system in which an electronically controlled powershift to avoid jolts during gearshifts. This enables extraction of maximum engine power from the engine operating at any given speed.

In none of the foregoing patents has a speed control device been identified in which a cone-shaped drive gear and an intermeshed driven gear provide for a constantly variable ratio between engine speed and torque upon demand such that a drive motor may operate at a constant speed while allowing various speeds to be transmitted to the driving wheels of the vehicle.

BRIEF SUMMARY OF THE INVENTION

In view of the foregoing disadvantages inherent in the known types of speed control systems, the present invention provides a solution via a self-contained system. The system includes a speed control device that also increases the torque.

To attain this objective, representative embodiments of the present invention are illustrated in the drawings of the self-contained speed control device for motors which includes a novel, cone-shaped drive-gear or continuous-gear, allowing for a constantly variable speed. This drives a second gear and shaft, the second, driven gear having the same diameter as the top of the cone-shaped drive gear. When the driven gear reaches the top of the drive cone, a 1 to 1 gear ratio is achieved, resulting in the two gears rotating at the same speed as the motor. The bottom of the cone, with a diameter, for example, equivalent to about a 6 to 1 ratio, and a motor speed of 3500 revolutions per minute, would turn the secondary shaft at 583 revolutions per minute. At the same time, the motor torque is increased without excessive battery drain. In order to have the teeth run in a straight line to prevent unwanted climbing of the driven gear, the teeth of the drive gear are of a variable pitch due to the cone shape of the gear.

To achieve a constant slide and variable gear ratio, the driven gear is made to slide at an angle to the drive gear. The teeth of the driven gear have the same variable pitch as the drive gear. The driven gear turns at the proper angle to change pitch as it slides. This is accomplished by means of a cam, welded to a sliding shaft that rides on the secondary drive shaft. The secondary drive shaft is mounted at a sufficient angle compared to the primary drive shaft to accommodate the larger driven gear diameter as it rotates to present a different pitch to the drive gear. The cam fits inside a bearing and then into the gear which turns on a splined drive shaft. As the driven gear is drawn up the drive gear under operator control, it follows a curved groove in a stationary shaft surrounding the upper end of the rotating splined secondary drive shaft. This rams the cam and changes the pitch of the driven gear accordingly.

There has thus been outlined, rather broadly, the more important features of the invention to provide a better understanding of the detail and description which follows, and to point out the novel features of the invention so that the instant contribution to the art may be better appreciated. Additional features of the invention will be appreciated from the detailed description which follows and which form the subject matter of the claims appended hereto. Those skilled in the art will appreciate that the specifics upon which the instant disclosure is based may readily be utilized as a basis for the design of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motor speed control apparatus which overcomes disadvantages of known motor controllers.

It is another object of the present invention to provide a motor speed control apparatus which may be easily and efficiently manufactured and used.

It is a further object of the present invention to provide a new and improved motor speed control apparatus which is of a durable and reliable construction.

A further object of the present invention is to provide a new and improved motor speed control apparatus which can be manufactured at low cost with regard to both materials and labor, and which accordingly is susceptible of low prices of sale, making an electric vehicle, a hybrid vehicle or a standard internal combustion engine drive vehicle more cost-effective, efficient, and competitive in today's market.

Another object of the invention is to provide a new and improved motor speed control apparatus which provides an efficient means for controlling motor speed, while overcoming some of the disadvantages normally associated therewith.

These together with other objects of the invention, along with various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention including its best mode.

BRIEF SUMMARY OF THE FIGURES

The invention will be better understood and the objects of the invention, including objects other than those set forth above, when consideration is given the following detailed description. Such description makes reference to the annexed drawings wherein.

DETAILED DESCRIPTION OF THE INVENTION

Figure 1:
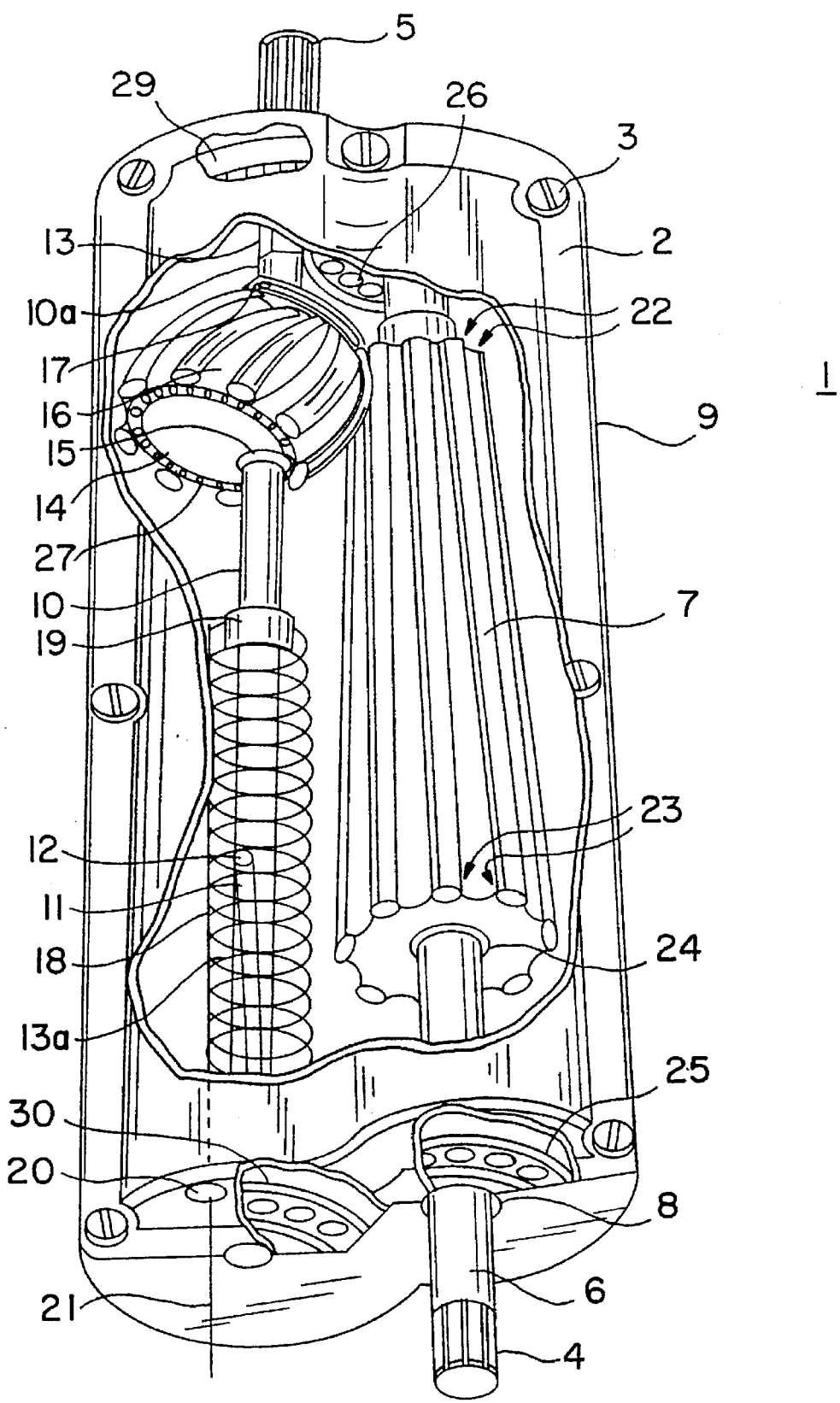
FIG. 1 is a top view of the self-contained motor speed control device with portions cut away to reveal underlying detail.

With reference now to the drawings, and in particular to FIG. 1, a new speed control system embodying the principles and concepts of the present invention and generally designated by the numeral 1 is described which includes a first drive shaft 6 driven by splines 4 or other conventional means of coupling to and in communication with a drive motor. The motor may be an internal combustion engine which uses gasoline or diesel fuel, a so-called hybrid vehicle, or, preferably, it is an electric motor. A cone-shaped drive gear 7 is welded to the drive shaft 6 at 24. The drive shaft 6 turns in bearings of conventional type located at 25 and 26 within housing 2.

The drive gear 7 is of a novel cone-shape and is a continuous gear with a constant change in the pitch of the teeth which run the longitudinal length of the gear. This variation in the pitch is shown as 22 and 23, wherein the pitch at any given point on the gear matches the diameter of the cone at that point on the gear. The diameter of the cone varies from a ratio of about $1/15$ at the narrow end to 1 at the top. Preferably, the ratio is 1:6. Power from the motor is transferred from drive gear 7 to a driven gear 16 by intermeshing of teeth of the drive gear and driven gear. Driven gear 16 also has teeth of variable pitch and is mounted on a secondary drive shaft 13. The pitch on the teeth of the driven gear varies from a pitch that matches the smallest pitch on drive gear 7 to a pitch that matches the largest pitch on drive gear 7. Preferably (see FIG. 2), the driven gear 16, in addition to having teeth radiating from one end of the gear to the other, also has foreshortened teeth 28 between adjacent full-length teeth, so that proper meshing with the narrowest diameter of the drive gear 7 is achieved. The drive shaft 13 is splined at the output distance internal to the shaft, away from the output extremity It is noted that said driven gear 16 may be a semi-spherically shaped driven gear 16 as shown, for example, in FIGS. 1 and 2.

The gear 16 is pivotally connected to a short first floating shaft 10a which is slidably mounted on the secondary drive shaft 13. The driven gear 16 is connected to shaft 10a by means of a pivot pin 17, or by means of a hex ball and socket, or any other flexible coupling which those skilled in the art could apply for this purpose. Rotation of the drive gear 7 causes the driven gear 16 to rotate. Because this gear is connected to shaft 10a, secondary drive shaft 13 is thereby cause to rotate by virtue of splines on the internal surface of shaft 10a which mesh with the splines on the secondary drive shaft 13.

Internal to the driven gear 16, there is provided a cam 14 which is surrounded by a bearing 27. The bearing 27 supports the driven gear 16, while at the same time allowing the cam to freely rotate within the driven gear 16. The cam 14 is fixed eccentrically (i.e. not in the center of the cam) to a second floating shaft 10 by welding 15 or other conventional means. Affixed to shaft 10 is a collar 19 to which is attached a cable 21 which is retracted through seal 20 under operator control when a change in the torque and speed being transmitted to the device attached to output 5 is desired. When the cable 21 is not retracted, collar 19, and therefore shaft 10 are biased to return to the non-retracted state by spring 18 positioned below collar 19. When the cable 21 is retracted, collar 19 and shaft 10 are forced to translate down a fixed shaft 13a, which is a fixed, grooved shaft surrounding the rotating secondary drive shaft 13. Shaft 13a is kept stationary by virtue of being welded to housing 2 or otherwise being held in place by conventional means, with shaft 13 being free to rotate therein. As shaft 10 translates along shaft 13a, gear 16 which is attached thereto moves accordingly. Shaft 10 follows a machined groove 11 in shaft 13a by means of a guide pin, such as a ball 12 welded to the inside of shaft 10, inserted in the groove 11. As shaft 10 follows the groove 11, cam 14 is forced to rotate accordingly due to the eccentric mounting of the cam 14 on the shaft 10 and the elliptical path of the groove 11. The change in orientation of shaft 10 caused by the translation along groove 11 forces driven gear 16 to present a different pitch to drive gear 7, and is thereby forced to rotate at a rate determined by the new ratio of diameters between driven gear 16 and the diameter of drive gear 7 at the new position of intermeshment. The secondary drive shaft is mounted at a sufficient angle compared to the primary drive shaft to accommodate the larger driven gear diameter as it rotates to present a different pitch to the drive gear.

Shaft 13 turns on bearings of conventional type at 29 and 30 within the inner surface of stationary shaft 13a within housing 2. The housing and components deployed therein are held in place by screws of a conventional type 3, and sealed by a gasket 9 and shaft seals 8 of a conventional type. Power is transmitted from shaft 13 by means of splines at output extremity 5 to a conventional coupling device. The result is a constantly varying speed control device.

Figure 2:
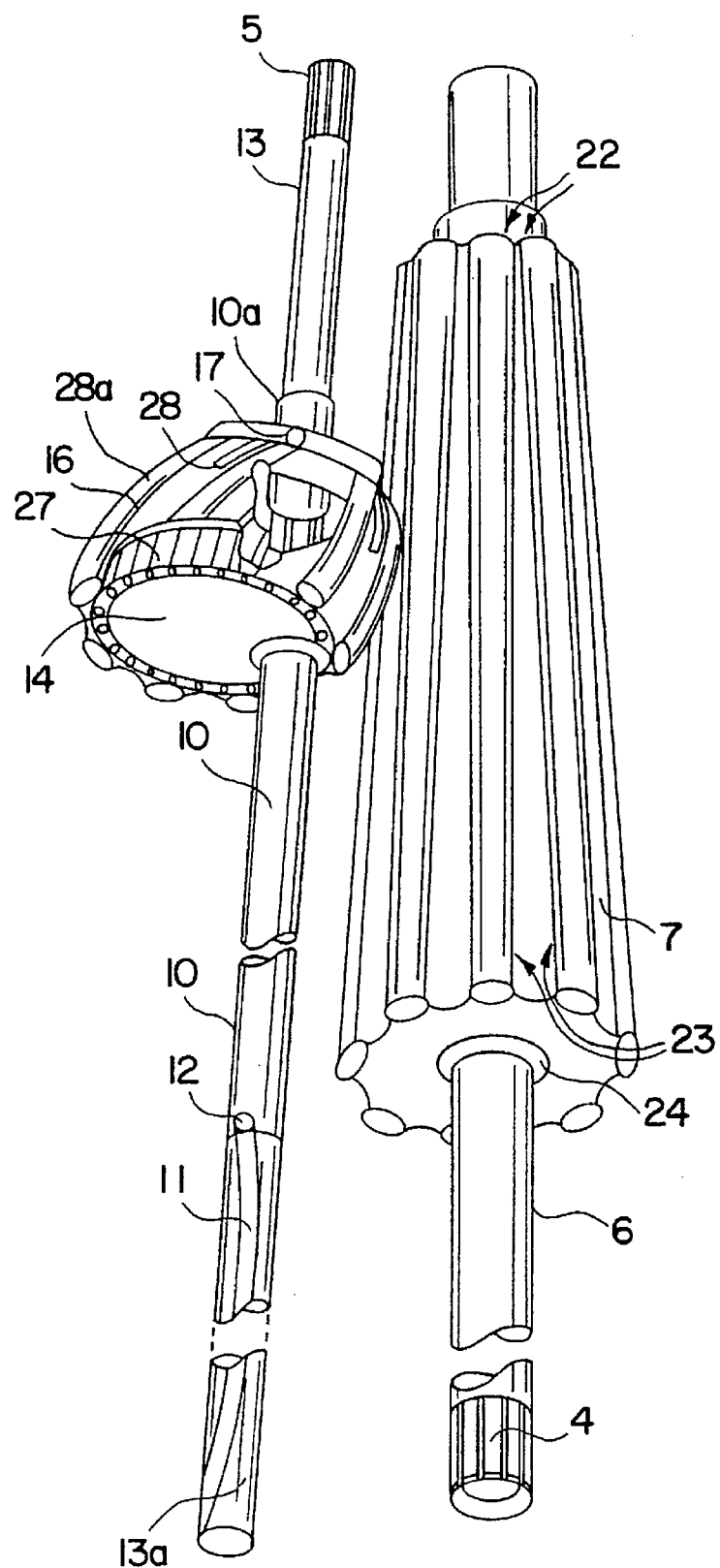
FIG. 2 is a detailed view illustrating the components of the gear assembly of the self-contained motor speed control device.

FIG. 2 illustrates, in greater detail, the function of the gears, with portions cut away, to give a better understanding of the invention. Shaft 10a is partially exposed to show that it is a separate shaft and is not part of shaft 10. Shaft 10a is a short shaft that is fastened to gear 16 at pin 17 and slides on shaft 13 which is turned by splines on the internal surface of shaft 10a which mesh with the splines on shaft 13 as gear 16 rotates. Foreshortened teeth 28 and full-length teeth 28a are shown.

Shaft 10 and cam 14 turn freely within gear 16 by virtue of bearing 27 which is of the conventional roller type. Shaft 10 is supported by shaft 13a which does not turn, allowing shaft 10 to slide freely thereon. Pin 12 follows groove 11 thereby turning cam 14. As a result, gear 16 is caused to move and change pitch as it translates up gear 7. As secondary drive shaft 13 turns, splines at the output extremity 5 of the shaft 13 turn and transmit torque to any device coupled thereto by means well known in the art.

Figure 3:
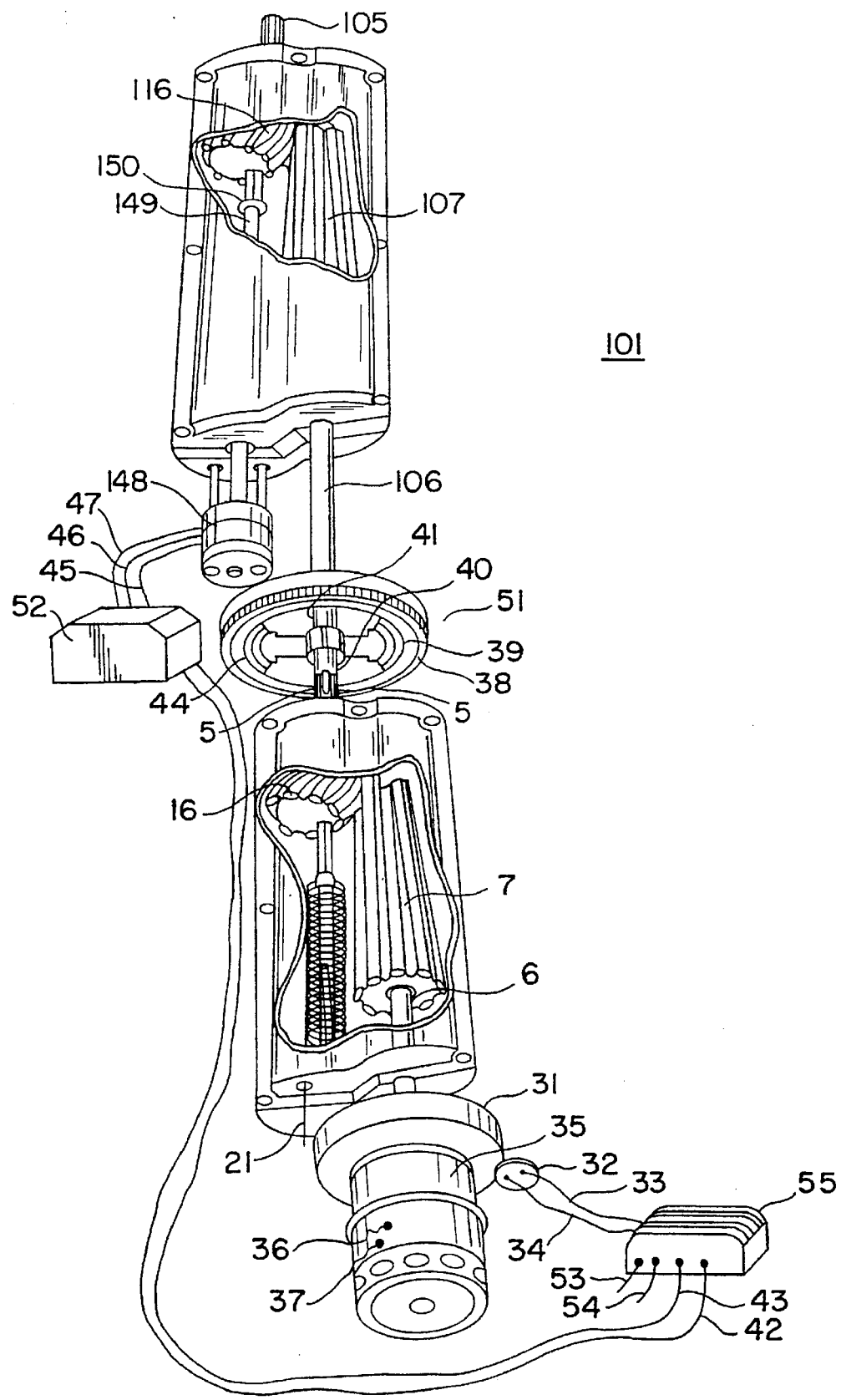
FIG. 3 is a detailed view showing a first and a second embodiment of this invention, arranged to show a complete drive train.
Figure 4:
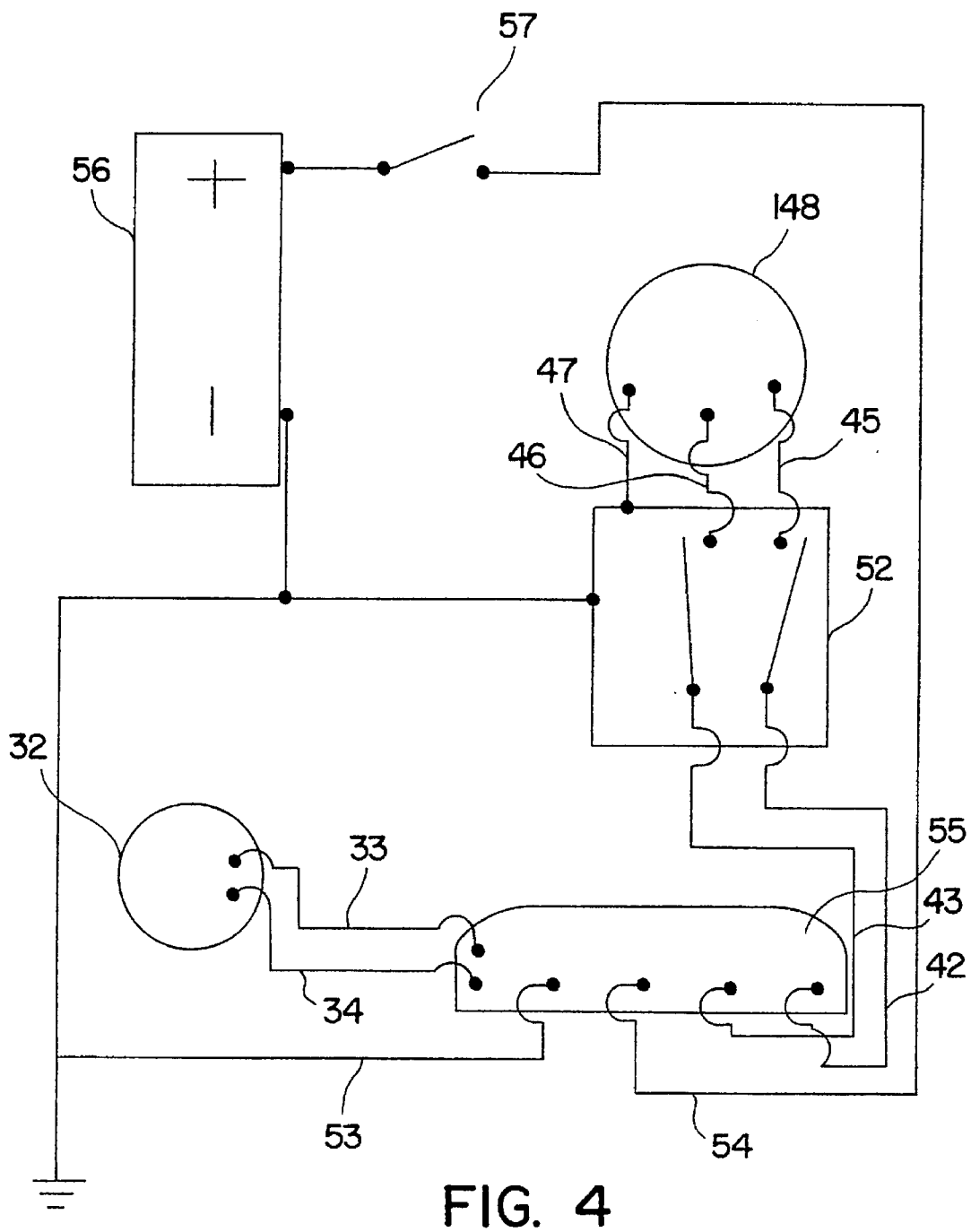
FIG. 4 is a schematic diagram illustrating the electrical components of one embodiment of this invention.

FIGS. 3 and 4 show another embodiment of the invention, constructed in a similar fashion to that described with respect to FIGS. 1 and 2. In this embodiment, 101, a device having the features of the first embodiment 1 described above is linked to a second device having similar features to form a variable transmission. The linked device in this embodiment comprises a main drive gear 107 and shaft 106, a driven gear 116 and drive shaft 105. The method of translation of gear 116 up or down gear 107 is similar to that described for gear 16. The accelerator cable 21 and return spring 18 are replaced in the linked device with a screw-type actuator motor 148 to move the drive gear 116 in communication with the drive gear 107 to change the torque ratio. By this arrangement, the motor speed control apparatus of this invention becomes a variable torque transmission that is fully automatic.

The variable torque transmission as described above is preferably connected to a flywheel 31, which is adapted to absorb initial load on the motor 35 which is in communication with the flywheel. Power is transmitted from the motor 35 through the flywheel 31 and into the transmission by means of shaft 6 and gear 7. The speed is thereby controlled by the ratio between gears 7 and 16, as described above. As the accelerator cable 21 is retracted by the operator, power is transferred from the speed control apparatus by means of the output extremity 5 of shaft 13. Output extremity 5 is coupled to a mechanical torque converter 51 by conventional means. As power is transferred from output extremity 5 to the torque converter 51, speed increases causing weighted shoes 39 and 44 that are in communication with the drive housing and controlled by the tension of springs 40 and 41 to press against the drive housing 38 to turn shaft 106, connected by conventional means. Gear 107 now rams gear 116 and output extremity 105 that is connected to the vehicle drive wheels or other driven device. A motor actuator 148 turns a screw type gear 149 connected to gear 116 by means of a collar 150. A load sensor 32, in communication with the flywheel, measures the changes in the load and transmits this information to a processor 55, through leads 33 and 34. Leads 43 and 42 connect the processor to a switching mechanism 52, sending power through line 46 or 47, to the motor actuator 148, depending in which direction (up or down gear 107) gear 116 needs to move, for the proper torque and speed. The actuator motor is grounded through line 45 at switching control box 52 which is grounded common. Power is sent to the processor 55 through lines 53 and 54 from battery 56. Switch 57 is the ignition switch. The main drive motor receives its power through terminals 36 and 37.

Accordingly, this invention provides a motor speed control device having a first, cone-shaped drive gear having teeth along the length of the cone. The teeth are spaced with a pitch that matches the diameter of the cone. A second, intermeshed, driven gear is also provided having teeth which at one end have a pitch that matches the smallest tooth pitch of said cone-shaped drive gear while the teeth at the other end of said driven gear have a pitch that matches the largest tooth pitch of said cone-shaped drive gear. Preferably, the first, cone-shaped drive gear and second driven gear are deployed within a housing. The gears are preferably mounted on a first and second drive shaft, and the drive shafts are rotatively supported by bearings mounted within the housing.

In a preferred embodiment, the motor speed control device has the following elements:

(a) a first, cone-shaped, drive gear having teeth of a pitch which varies in relation to the diameter of the cone-shaped gear;

(b) a first drive-shaft to which the drive gear is welded. The first drive-shaft receives rotational torque from an attached motor or engine, resulting in the rotation of the first drive-shaft and the drive gear;

(c) a second, semi-spherically shaped, driven gear which has teeth of varying pitch, from a pitch that matches the smallest pitch to a pitch that matches the largest pitch of the teeth in the drive gear and which are in intermeshed relationship therewith;

(d) a secondary drive shaft to which the driven gear is pivotally and slidably attached. The secondary drive shaft is mounted at a sufficient angle compared to the primary drive shaft to accommodate the larger driven gear diameter as it rotates to present a different pitch to the drive gear. The second drive shaft is splined at an output extremity, and the splines extend from the output extremity to a location some distance away from the extremity. The splines at the output extremity are available for transmission of rotational torque to any device attached thereto;

(e) a first floating shaft which slides on the secondary drive shaft, and to which the driven gear is pivotally attached. The first floating shaft is splined on its internal dimension so as to mesh with the splines on the secondary drive shaft such that as the driven gear rotates, it causes the secondary shaft to rotate via the internally splined first floating shaft intermediate the driven gear and the secondary drive shaft;

(f) a cam surrounded by a bearing, within the driven gear, such that the cam freely rotates within the driven gear while at the same time supporting the driven gear;

(g) a second floating shaft to which the cam is fastened so that as the cam rotates, the second floating shaft rotates. The second floating shaft has a guide pin at the extremity of the second floating shaft, away from the point of attachment of the cam;

(h) a fixed, grooved shaft, surrounding the secondary drive shaft and upon which the second floating shaft slides. The guide pin of the second floating shaft is set within the groove of the fixed grooved shaft, such that as the second floating shaft slides over the fixed grooved shaft, it turns as directed by the guide pin as it translates within the elliptical groove so as to cause the teeth of the driven gear to mesh with the teeth of the driving gear at ever changing pitches within the range from the smallest pitch to the greatest pitch, resulting in a constantly varying ratio between the drive gear and the driven gear such that the output extremity of the secondary drive shaft rotates at a constantly variable rate; and (i) an operator controlled means for causing the second floating shaft to translate down the fixed grooved shaft. The control means may be a simple accelerator cable linked by conventional means to the second floating shaft which the operator retracts as increased speed is desired. The control means also includes a biasing means for returning the second floating shaft, and therefore the driven gear, up the fixed grooved shaft, as the speed of the vehicle is to be reduced (i.e., when the operator releases the retraction on the accelerator cable).

In a further embodiment, the output extremity of the second drive is linked to a torque converter, and this is preferably linked to a second motor speed control device, thereby providing a variable torque transmission.

With respect the above description, it is to be realized that the optimum dimensional relationships for the parts of the herein disclosed invention include readily apparent and obvious variations in size, materials, shape, form, function and manner of operation, assembly and use. Thus, one skilled in the art would recognize that equivalent relationships to those illustrated in the drawings and described in the specification are encompassed by the present invention. Therefore, the foregoing is considered as illustrative of the principles of the invention. Further, since numerous modifications and changes will readily occur to those skilled in the art, it is not desired to limit the invention to the exact construction and operation shown and described and accordingly, all suitable modifications and equivalents which may resorted to, fall within the scope of the invention.

REFERENCES

Kirkham, Charles B., U.S. Pat. No. 1,392,276, issued Sep. 27, 1921.

Togami, Paul G., Gary Drayer, James M. Francis, U.S. Pat. No. 4,173,155, issued Nov. 6, 1979.

Horowitz, Alexandre, Rudolf J. G. A. van der Hoorn, Jozef W. M. Kummeling, U.S. Pat. No. 4,173,156, issued Nov. 6, 1979.

Berman, Max, William G. Klirnrnek, Charles E. Konrad, U.S. Pat. No. 4,427,930, issued Jan. 24, 1984.

Tsukihashi, Akira, U.S. Pat. No. 4,427,931, issued Jan. 24, 1984.

Nakano, Masaki, U.S. Pat. No. 5,067,360, issued Nov. 26, 1991.

Lachenrnaier, Sepp, U.S. Pat. No. 5,067,361 issued Nov. 26, 1991.

Suzuki, Yutaka, U.S. Pat. No. 5,067,372, issued Nov. 26, 1991.

Lutz, Manfred, U.S. Pat. No. 5,318,486, issued Jun. 7, 1994.

Knotts, Stephen E., U.S. Pat. No. 5,381,704, issued Jan. 17, 1995.

Jarchow, Friedrich, Peter Tenberge, Dietrich Haensel, Peter Döttger, U.S. Pat. No. 5,403,241, issued Apr. 4, 1995.

Tankersley, Jerome B., Richard W. Boothe, Charles E. Konrad, U.S. Pat. No. 5,403,244, issued Apr. 4, 1995.

Kallis, Adrian G., Charles D. Needbarn, Keven L. Brekkestran, Barry D. Batcheller, U.S. Pat. No. 5,406,483, issued Apr. 11, 1995.

I claim:

1. A motor speed control device comprising a first, cone-shaped drive gear having teeth along the length of the cone wherein said teeth are spaced with a pitch that matches the diameter of the cone; and a second, intermeshed, driven gear having teeth which at one end have a pitch that matches the smallest tooth pitch of said cone-shaped drive gear while the teeth at the other end of said driven gear have a pitch that matches the largest tooth pitch of said cone-shaped drive gear.

2. The motor speed control device of claim 1 wherein said first, cone-shaped drive gear and said second driven gear are deployed within a housing, said gears are mounted on a first and secondary drive shaft, and said drive shafts are rotatively supported by bearings mounted within said housing.

3. The motor speed control device of claim 2 comprising:
   (a) said first, cone-shaped, drive gear having teeth of a pitch which varies in relation to the diameter of said cone-shaped gear; and
   (b) said first drive-shaft, wherein said drive gear is welded to said first drive-shaft, said first drive-shaft receiving rotational torque from an attached motor or engine, resulting in the rotation of said first drive-shaft and said drive gear;
   (c) a second, semi-spherically shaped, driven gear which has teeth of varying pitch, radiating from one end of the gear to the other, from a pitch that matches the smallest pitch to a pitch that matches the largest pitch of the teeth in said drive gear and which are in intermeshed relationship therewith;

(d) a secondary drive shaft to which said driven gear is pivotally and slidably attached, wherein said secondary drive shaft is mounted at a sufficient angle compared to said first drive-shaft to accommodate the larger driven gear diameter as it rotates to present a different pitch to the drive gear, and wherein said secondary drive shaft is splined at an output extremity, said splines extending from said output extremity to a location some distance away from said extremity, and wherein said splines at said output extremity are available for transmission of rotational torque to any device attached thereto;

(e) a first floating shaft which slides on said secondary drive shaft, and to which said driven gear is pivotally attached, wherein said first floating shaft is splined on its internal dimension so as to mesh with said splines on said secondary drive shaft such that as said driven gear rotates, it causes said secondary shaft to rotate via said internally splined first floating shaft intermediate said driven gear and said secondary drive shaft;

(f) a cam surrounded by a bearing, within said driven gear, such that said cam freely rotates within said driven gear while at the same time supporting said driven gear;

(g) a second floating shaft to which said cam is fastened so that as said cam rotates, said second floating shaft rotates, and wherein said second floating shaft has a guide pin at the extremity of said second floating shaft away from the point of attachment of said cam;

(h) a fixed, grooved shaft, surrounding said secondary drive shaft and upon which said second floating shaft slides, and wherein said guide pin of said second floating shaft is set within said groove of said fixed grooved shaft, such that as said second floating shaft slides over said fixed grooved shaft, it turns as directed by said guide pin as it translates within said groove so as to cause the teeth of said driven gear to mesh with said teeth of said driving gear at ever changing pitches within the range from the smallest pitch to the greatest pitch, resulting in a constantly varying ratio between said drive gear and said driven gear such that said output extremity of said secondary drive shaft rotates at a constantly varying rate; and (i) a control means linked to said second floating shaft such that an operator controls the translation of said second floating shaft down said fixed, grooved shaft, wherein said control means includes a biasing means for returning said second floating shaft upward on said fixed grooved shaft.

4. The motor speed control device of claim 3 wherein said driven gear, in addition to said teeth of varying pitch radiating from one end of the gear to the other, has foreshortened teeth between adjacent full-length teeth, so that proper meshing with the narrowest diameter of said first, cone-shaped drive gear is achieved.

5. The motor speed control device of claim 3 wherein said output extremity of said second drive is linked to a torque converter.

6. The motor speed control device of claim 4 wherein said torque converter is linked to a second motor speed control device.

* * * * *

UNITED STATES PATENT AND TRADEMARK OFFICE
CERTIFICATE OF CORRECTION

PATENT NO. : 5,660,077
DATED : Aug. 26, 1997
INVENTOR(S) : Frank F. Nekola

It is certified that error appears in the above-identified patent and that said Letters Patent is hereby corrected as shown below:

In column 3, line 15, please change "rams" to --turns--.
In column 4, line 49, after the word "output" and before the word "distance", please insert --extremity 5, and these splines extend from the output extremity to a location some--.
In column 4, line 50, after the word "extremity" and before the word "It", please insert --.--.
In column 6, line 24, please change "rams" to --turns--.
In column 8, line 16, please change "Klirnrnek" to --Klimmek--.
In column 8, line 22, please change "Lachenrnaier" to --Lachenmaier--.

Signed and Sealed this

Second Day of December, 1997

Attest:

BRUCE LEHMAN

*Attesting Officer*  *Commissioner of Patents and Trademarks*